United States Patent [19]

Etzbach et al.

[11] Patent Number: 4,837,269
[45] Date of Patent: Jun. 6, 1989

[54] 2-AMINOTHIOPHENE RADICAL SUBSTITUTED BY AN ELECTRON WITHDRAWING GROUP

[75] Inventors: Karl-Heinz Etzbach, Frankenthal; Guenter Hansen; Ernst Schefczik, both of Ludwigshafen; Helmut Reichelt, Niederkirchen, all of Fed. Rep. of Germany

[73] Assignee: BASF Aktiengesellschaft, Ludwigshafen, Fed. Rep. of Germany

[21] Appl. No.: 68,168

[22] Filed: Jun. 30, 1987

[30] Foreign Application Priority Data

Jul. 3, 1986 [DE] Fed. Rep. of Germany ....... 3622297

[51] Int. Cl.$^4$ ............ C09B 31/02; C09B 33/02; C09B 35/037
[52] U.S. Cl. ................................. 534/761; 534/588; 534/630; 534/753; 534/757
[58] Field of Search ............... 534/761, 788, 757, 630

[56] References Cited

U.S. PATENT DOCUMENTS

| 4,180,503 | 12/1979 | Vor Derbruck et al. | 534/761 |
| 4,264,495 | 4/1981 | Maher et al. | 534/753 |
| 4,621,136 | 11/1986 | Imahori et al. | 534/761 |

FOREIGN PATENT DOCUMENTS

| 3535134 | 4/1981 | Fed. Rep. of Germany | 537/753 |
| 3507421 | 9/1986 | Fed. Rep. of Germany | 534/753 |
| 57-165355 | 10/1982 | Japan | 534/761 |
| 57-212255 | 12/1982 | Japan | 534/761 |
| 59-042376 | 3/1984 | Japan | 534/761 |
| 59-145254 | 8/1984 | Japan | 534/761 |
| 59-197464 | 11/1984 | Japan | 534/761 |
| 60-190776 | 9/1985 | Japan | 534/761 |
| 1461738 | 8/1974 | United Kingdom | 534/753 |
| 2114144 | 8/1983 | United Kingdom | 534/761 |

OTHER PUBLICATIONS

Chemical Abstracts, Band 104, Nr. 22, Juni 1986, Seite 92, Zusammenfassung Nr. 188160v, Columbus, OH, U.S.; & JP-A-60 223 863, (Mitsui Toatsu Chemicals, Inc.), 08-11-1985, Ito et al.
Chemical Abstracts, Band 105, Nr. 16, Oktober 1986, Seite 76, Zusammenfassung Nr. 135409x, Columbus, OH, U.S. & JP-A-61-28 556, (Mitsui Totsu Chemicals, Inc.), 08-02-1986, Ito et al, II.
J. Org. Chem., vol. 38, No. 20, pp. 3616, 3617.
J. Heterocyclic Chem., 16, pp. 1541–1543, (1979) Elnagdi et al.

Primary Examiner—Floyd D. Higel
Attorney, Agent, or Firm—Oblon, Fisher, Spivak, McClelland & Maier

[57] ABSTRACT

Disazothiphene dyes of the formula

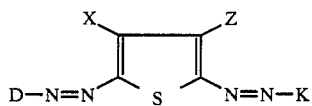

where X is an electron withdrawing group, Z is an electron withdrawing group, D is the radical of a diazo component and K is the radical of a coupling component, are highly suitable for dyeing synthetic fibers, in particular polyesters.

24 Claims, No Drawings

2-AMINOTHIOPHENE RADICAL SUBSTITUTED BY AN ELECTRON WITHDRAWING GROUP

SUMMARY OF THE INVENTION

The present invention relates to disazothiophene dyes of the formula I

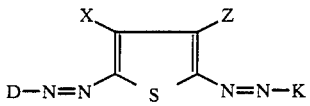
(I)

where
X is fluorine, chlorine, bromine, hydroxyl, mercapto, $C_1$-$C_4$-alkoxy which may be substituted by phenyl, $C_5$-$C_7$-cycloalkoxy, sustituted or unsubstituted phenoxy, $C_1$-$C_4$-alkylthio which may be substituted by phenyl, $C_5$-$C_7$-cycloalkylthio, substituted or unsubstituted phenylthio, or $SO_2$—E, where E is unsubstituted or phenyl-substituted $C_1$-$C_8$-alkyl, $C_3$-$C_4$-alkenyl, $C_5$-$C_7$-cycloalkyl, substituted or unsubstituted phenyl, chlorine, hydroxyl or $C_1$-$C_4$-alkoxy which may be substituted by phenyl, or is substituted or unsubstituted phenoxy, amino, $C_1$-$C_4$-monoalkylamino or -dialkylamino or substituted or unsubstituted phenylamino, Z is cyano, nitro, $C_1$-$C_8$-alkanoyl, substituted or unsubstituted benzoyl, $C_1$-$C_4$-alkylsulfonyl, substituted or unsubstituted phenylsulfonyl, carboxyl, or $C_1$-$C_8$-alkoxycarbonyl whose alkyl chain may be interrupted by one or more oxygen atoms, or is substituted or unsubstituted phenoxycarbonyl, carbamoyl, $C_1$-$C_8$-monoalkylcarbamoyl or -dialkylcarbamoyl, pyrrolidinocarbonyl, piperidinocarbonyl, morpholinocarbonyl, piperazinocarbonyl or (N-$C_1$-$C_4$-alkyl)piperazinocarbonyl, D is the radical of a diazo component and
K is the radical of a coupling component.

DETAILED DESCRIPTION OF THE PREFERRED EMBODIMENTS

All the alkyl groups in the formulae of the disazothiophene dyes according to the invention may be straight-chain or branched.

Where substituted phenyl appears in the formulae of the disazothiophene dyes according to the invention, possible substituents are $C_1$-$C_4$-alkyl, $C_1$-$C_4$-alkoxy or halogen.

Examples of radicals X, in addition to those already mentioned, are $OCH_3$, $OC_2H_5$, $OC_3H_7$, $OC_4H_9$, $OCH_2C_6H_5$, $OC_6H_{11}$, $OC_6H_5$, $OC_6H_4CH_3$, $OC_6H_4Cl$, $SCH_3$, $SC_2H_5$, $SC_3H_7$, $SC_4H_9$, $SCH_2C_6H_5$, $SC_2H_4OH$, $SCH_2CO_2CH_3$, $SCH_2CO_2C_2C_2H_5$, $SC_6H_{11}$, $SC_6H_5$ and $SC_6H_4CH_3$.

Examples of radicals E are $CH_3$, $C_2H_5$, $C_3H_7$, $C_4H_9$, $C_6H_{13}$, $C_6H_{11}$, $C_8H_{17}$, $C_6H_5$—$CH_2$, $C_6H_5$—$CH_2$—$CH_2$, $C_6H_5$, $Cl$—$C_6H_4$, $C_4H_9$—$C_6H_4$, $Cl$, $OH$, $CH_3O$, $C_2H_5O$, $C_3H_7O$, $C_4H_9O$, $C_6H_5$—$CH_2O$, $C_6H_5$—$CH_2$—$CH_2O$, $C_6H_5O$, $ClC_6H_4O$, $CH_3C_6H_4O$, $NH_2$, $NHCH_3$, $N(CH_3)_2$, $NHC_2H_5$, $N(C_2H_5)_2$, $NHC_4H_9$, $N(C_4H_9)_2$, $NHC_6H_5$, $NHC_6H_4$—$CH_3$, $NHC_6H_4Cl$ and $NCH_3C_6H_4$.

Examples of radicals Z, in addition to those already mentioned, are $CH_3CO$, $C_2H_5CO$, $C_3H_7CO$, $C_4H_9CO$, $C_5H_{11}CO$, $C_7H_{15}CO$,

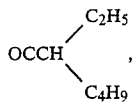

$C_6H_5CO$, $CH_3C_6H_4CO$, $ClC_6H_4CO$, $(CH_3)_2C_6H_3CO$, $H_3COC_6H_4CO$, $Cl_2C_6H_3CO$, $CH_3SO_2$, $C_2H_5SO_2$, $C_4H_9SO_2$, $C_6H_5SO_2$, $CH_3C_6H_4SO_2$, $ClC_6H_4SO_2$, $COOCH_3$, $COOC_2H_5$, $COOC_3H_7$, $COOC_4H_9$, $COOC_6H_{13}$, $COOC_8H_{17}$,

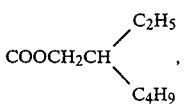

$COOC_2H_4OCH_3$, $COOC_2H_4OC_2H_5$, $COOC_2H_4OC_4H_9$, $COOC_6H_5$, $COOC_6H_4CH_3$, $CONH_2$, $CONHCH_3$, $CONHC_2H_5$, $CONHC_4H_9$, $CONHC_6H_{13}$, $CONHC_8H_{17}$, $CON(CH_3)_2$, $CON(C_2H_5)_2$, $CON(C_4H_9)_2$ and

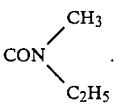

The radicals D of the diazo components are preferably derived from the aniline series or from heterocyclic components for example from the thiophene, thiazole, isothiazole, thiadiazole, benzothiazole or benzisothiazole series.

These diazo components $DNH_2$ conform to the formula

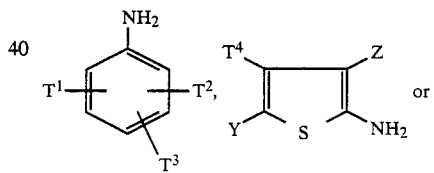
or

where
$T^1$ and $T^2$ are each hydrogen, chlorine, bromine, cyano, $CF_3$, nitro, $C_1$-$C_4$-alkyl, $C_1$-$C_4$- alkoxy, phenoxy, phenyl, $C_1$-$C_4$-alkylcarbonyl, $C_1$-$C_4$-alkoxy-carbonyl, $C_1$-$C_4$-alkylsulfonyl, substituted or unsubstituted phenylsulfonyl, benzylsulfonyl, carboxyl, carbamoyl, $C_1$-$C_4$-monoalkylcarbamoyl or-dialkylcarbamoyl, which may be substituted by hydroxyl, or is sulfamoyl or $C_1$-$C_4$-monoalkylsulfamoyl or -dialkylsulfamoyl which may be substituted by hydroxyl,
$T^3$ is hydrogen, chlorine, bromine, $C_1$-$C_4$-alkyl or cyano,
$T^4$ is hydrogen, $C_1$-$C_4$-alkyl, substituted or unsubstituted phenyl, thienyl, furyl, halogen, $C_1$-$C_4$-alkylsulfonyl, substituted or unsubstituted phenylsulfonyl, $C_1$-$C_4$-alkoxy, phenoxy, substituted or unsubstituted $C_1$-$C_4$-alkylthio or phenylthio, $T^5$ is substituted or unsubstituted $C_1$-$C_4$-alkyl, or substituted or unsubstituted phenyl, Y is hydrogen, C-$C_4$-alkyl, substituted or unsubstituted phenyl, chlorine, bromine, nitro, cyano, $C_1$-$C_4$-alkanoyl, benzoyl, $C_1$-$C_4$-alkoxycarbonyl, $C_1$-$C_4$-alkylsulfonyl or phenylsulfonyl and W is cyano, nitro, $C_1$-$C_4$-alkoxycarbonyl, phenoxycarbonyl, chlorine or bromine and Z has the above mentioned meaning.

Examples of $T^1$ and $T^2$, in addition to those already mentioned, are methyl, ethyl, methoxy, ethoxy, methylcarbonyl, ethoxycarbonyl, ethylsulfonyl, phenylsulfonyl, dimethylcarbamoyl, 2-hydroxyethylcarbamoyl and 2-hydroxypropylsulfamoyl.

Examples of $T^3$, in addition to those already mentioned, are methyl, ethyl, propyl and butyl.

Where $T^4$ is substituted $C_1$-$C_4$-alkylthio, suitable substituents are hydroxyl, $C_1$-$C_4$-alkoxycarbonyl, $C_1$-$C_4$-alkylcarbonyl, cyano or nitro. $T^4$ is for example methyl, ethyl, 4-chlorophenyl, thien-2-yl, fur-2-yl, chlorine, bromine, methylsulfonyl, ethylsulfonyl, methoxy, ethoxy, methylthio, ethylthio or 2-hydroxyethylthio.

All the radicals mentioned for $T^5$ can be substituted for example by chlorine, bromine, hydroxyl or $C_1$-$C_4$-alkoxy. $C_1$-$C_4$-Alkyl can additionally be substituted by phenyl. $T^5$ is for example methyl, ethyl, isopropyl, benzyl, 2-phenylethyl, 2-hydroxyethyl, 2-methoxyethyl, 2-chlorophenyl or 2-hydroxyphenyl.

Examples of Y, in addition to those already mentioned, are HCO, $CH_3CO$, $C_2H_5CO$, $C_6H_5CO$, $CH_3SO_2$, $C_2H_5SO_2$, $C_6H_5SO_2$, $CH_3$, $C_2H_5$, $C_3H_7$, $C_4H_9$, $C_6H_5$, $C_6H_4CH_3$, $C_6H_4Cl$ and $C_6H_4OCH_3$.

Examples of W, in addition to those already mentioned, are methoxycarbonyl, ethoxycarbonyl, butoxycarbonyl and phenoxycarbonyl.

The radicals K of the coupling components are preferably derived from the aniline, α-naphthylamine, pyrazole, aminopyrazole, indole, thiazole, thiophene, phenol, naphthol, tetrahydroquinoline, pyridone or pyridine series, preference being given to those which are derived from the pyrazole, pyridine, thiophene, thiazole or pyridone series and in particular from the aniline series.

The coupling components HK conform in particular to the formula

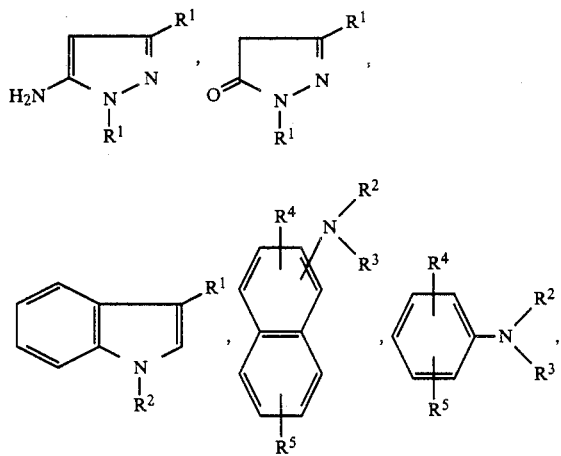

-continued

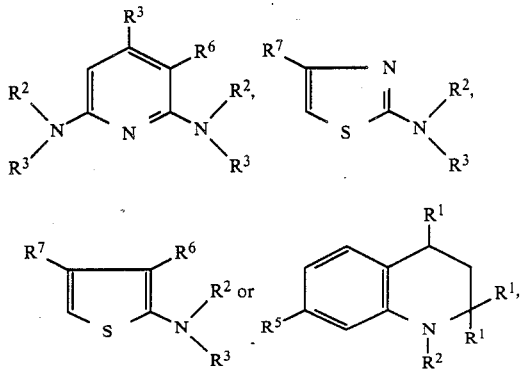

$R^1$ is hydrogen or $C_1$-$C_4$-alkyl which may be substituted by phenyl, or is substituted or unsubstituted phenyl, $R^2$ is hydrogen or $R^3$, $R^3$ is substituted or unsubstituted $C_1$-$C_6$-alkyl, $C_5$-$C_7$-cycloalkyl, $C_3$-$C_4$-alkenyl or substituted or unsubstituted phenyl, $R^4$ and $R^5$ are each independently of the other hydrogen, $C_1$-$C_4$-alkyl, $C_1$-$C_4$-alkoxy, phenoxy, benzyloxy, halogen, $C_1$-$C_4$-alkylsulfonylamino, $C_1$-$C_4$-dialkylaminosulfonylamino, substituted or unsubstituted $C_1$-$C_4$-alkoxycarbonylamino, substituted or unsubstituted benzoylamino or substituted or unsubstituted $C_1$-$C_6$-alkanoylamino, $R^6$ is cyano, carbamoyl, $C_1$-$C_4$-monoalkylcarbamoyl or -dialkylcarbamoyl, nitro or $C_1$-$C_8$-alkoxycarbonyl whose alkyl chain may be interrupted by one or more oxygen atoms, and $R^7$ is halogen, substituted or unsubstituted phenyl or $C_1$-$C_{10}$-alkyl or -alkoxy, which may be substituted by phenyl and/or whose alkyl chains may each be interrupted by one or more oxygen atoms, or is phenoxy, nitro, $C_1$-$C_4$-alkoxycarbonyl, $C_1$-$C_4$-monoalkylamino or -dialkylamino, $C_1$-$C_4$-alkylthio, phenylthio, $C_1$-$C_5$-alkanoylamino, $C_1$-$C_4$-alkoxycarbonylmethyl or cyanomethyl.

Examples of $R^1$, in addition to those already mentioned, are methyl, ethyl, propyl, butyl, benzyl, phenethyl, phenyl, o-, m- or p-tolyl and o-, m- or p-chlorophenyl.

Where $R^3$ is substituted $C_1$-$C_6$-alkyl, suitable substituents are chlorine, bromine, hydroxyl, $C_1$-$C_8$-alkoxy, phenoxy, phenyl, cyano, carboxyl, $C_1$-$C_8$-alkanoyloxy, $C_1$-$C_8$-alkoxy-$C_1$-$C_4$-alkoxy, benzyloxy, o-, m- or p-methylbenzoyloxy, o-, m- or p-chlorobenzoyloxy, $C_1$-$C_4$alkoxy-$C_1$-$C_8$-alkanoyloxy, phenoxyalkanoyloxy, $C_1$-$C_8$-alkoxycarbonyloxy, $C_1$-$C_4$-alkoxy-$C_1$-$C_4$-alkoxycarbonyloxy, benzyloxycarbonyloxy, phenethyloxycarbonyloxy, phenoxyethoxycarbonyloxy, $C_1$-$C_8$-alkylaminocarbonyloxy, cyclohexylaminocarbonyloxy, phenylaminocarbonyloxy, $C_1$-$C_8$-alkoxycarbonyl, $C_1$-$C_4$-alkoxy-$C_1$-$C_4$-alkoxycarbonyl, phenoxycarbonyl, benzyloxycarbonyl, phenoxy-$C_1$-$C_4$-alkoxy or phenethyloxycarbonyl.

Specific examples of $R^3$ are methyl, ethyl, propyl, butyl, pentyl, hexyl, allyl, methallyl, 2-chloroethyl, 2-bromoethyl, 2-cyanoethyl, 2-hydroxyethyl, 2-phenyl-2-hydroxyethyl, 2,3-dihydroxypropyl, 2-hydroxypropyl, 2-hydroxybutyl, 2-hydroxy-3-phenoxypropyl, 2-hydroxy-3-methoxypropyl, 2-hydroxy-3-butoxypropyl, 3-hydroxypropyl, 2-methoxyethyl, 2-ethoxyethyl, 2- propoxyethyl, 2-butoxyethyl, 2-phenoxyethyl, 2-phenoxypropyl, 2-acetoxyethyl, 2-propionyloxyethyl, 2-butyryloxyethyl, 2-isobutyryloxyethyl, 2-methoxymethylcarbonyloxyethyl, 2-ethoxymethylcarbonyloxyethyl, 2-phenoxymethylcarbonyloxyethyl, 2-methoxycarbonyloxyethyl, 2-ethoxycarbonyloxyethyl, 2-propoxycarbonyloxyethyl, 2-butoxycarbonyloxyethyl, 2-phenyloxycarbonyloxyethyl, 2-benzyloxycarbonyloxyethyl, 2-methoxyethoxycarbonyloxyethyl, 2-ethoxyethoxycarbonyloxyethyl, 2-propoxyethoxycarbonyloxyethyl, 2-butoxyethoxycarbonyloxyethyl, 2-methylaminocarbonyloxyethyl, 2-ethylaminocarbonyloxyethyl, 2-propylaminocarbonyloxyethyl, 2-butylaminocarbonyloxyethyl, 2-methoxycarbonylethyl, 2-ethoxycarbonylethyl, 2-propoxycarbonylethyl, 2-butoxycarbonylethyl, 2-phenoxycarbonylethyl, 2-benzyloxycarbonylethyl, 2-β-phenylethoxycarbonylethyl, 2-methoxyethoxycarbonylethyl, 2-ethoxyethoxycarbonylethyl, 2-propoxyethoxycarbonylethyl, 2-butoxyethoxycarbonylethyl, 2-phenoxyethoxycarbonylethyl, 2-benzoylethyl, cyclopentyl, cyclohexyl, phenyl and 4-methoxyphenyl.

Where $R^4$ and $R^5$ are each substituted $C_1$-$C_4$-alkoxycarbonylamino, benzoylamino or $C_1$-$C_6$-alkanoylamino, possible substituents are in each chlorine, bromine, cyano, methoxy, ethoxy or phenoxy. $R^4$ and $R^5$ are each for example methyl, ethyl, methoxy, ethoxy, chlorine, bromine, methyl sulfonylamino, dimethylaminosulfonylamino, methoxycarbonylamino, acetylamino or chloroacetylamino.

Examples of $R^6$, in addition to those already mentioned, are carbamoyl, methylaminocarbonyl, dimethylaminocarbonyl, ethylaminocarbonyl, diethylaminocarbonyl, methoxycarbonyl, ethoxycarbonyl, n- or i-propoxycarbonyl, n-, i- or sec-butoxycarbonyl, methoxyethoxycarbonyl, ethoxyethoxycarbonyl, n- or i-propoxyethoxycarbonyl, n-, i-or sec-butoxyethoxycarbonyl.

Examples of $R^7$ are chlorine, bromine, 4-chlorophenyl, methyl, ethyl, benzyl, phenylethyl, methoxy, ethoxy, 2-methoxyethoxy, 2-butoxyethoxy, benzyloxy, methoxycarbonyl, methylamino, ethylamino, dimethylamino, methylethylamino, methylthio, acetylamino, propionylamino and methoxycarbonylmethyl.

The compounds of the formula I can be prepared in a conventional manner.

For example, disazothiophene dyes of the formula I are obtained by coupling a diazotized amine of the formula II $$D-NH_2 \quad (II)$$

where D has the abovementioned meanings, onto an aminothiophene of the formula III

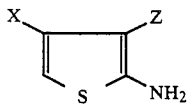

(III)

where X and Z each have the abovementioned meanings, and again diazotizing the resulting dye of the formula IV

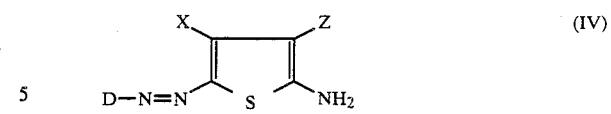

(IV)

where D, X and Z each have the abovementioned meanings, and coupling onto a coupling component of the formula V $$H-K \quad (V)$$

where K has the abovementioned meanings.

The aminothiophenes of the formula III are known from earlier applications DE-A-3,507,421 and DE-A-3,535,134 or can be prepared according to the methods described therein or in conventional manner.

Furthermore, further dyes according to the invention can be prepared by replacing the halogen in dyes of the forumula IV

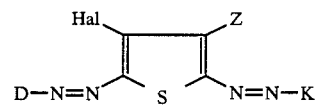

(VI)

where D, Z and K each have the abovementioned meanings and Hal is halogen, by appropriate radicals Y, for example phenylthio or phenylsulfonyl.

Further details of the preparation of the disazothiophene dyes according to the invention can be found in the Examples.

Dyed up, the novel disazothiophene dyes of the formula I have hues ranging from red to greenish blue. The are suitable for dyeing synthetic fibers, for example polyesters, nylons, cellulose esters or blend fabrics composed of polyesters and cellulose fibers. The dyeings obtained generally have good to very good fastness properties, in particular on polyesters.

Given a suitable constitution, the dyes are also dischargeable under alkaline and/or reducing conditions in a conventional manner.

Particular importance attaches to disazothiophene dyes of the formula I where

X is chlorine, bromine, hydroxyl, mercapto or $C_1$-$C_4$-alkoxy which may be substituted by phenyl, or is $C_5$-$C_7$-cycloalkoxy, substituted or unsubstituted phenoxy or $C_1$-$C_4$-alkylthio which may be substituted by phenyl, or is $C_5$-$C_7$-cycloalkylthio, substituted or unsubstituted phenylthio or $SO_2$—E, where E is methyl, ethyl or phenyl, Z is cyano or $C_1$-$C_8$-alkoxycarbonyl whose alkyl chain may be interrupted by one or more oxygen atoms, is the D radical of a diazo component of the benzene, thiophene or isothiazole series and K is the radical of a coupling component of the aniline or pyridine series.

Industrially particularly useful compounds of the formula I where

X is chlorine, ethoxy, phenylsulfonyl or phenylmercapto,

Z is cyano,

D is the radical of a diazo component of the benzene series and

K is the radical of a coupling component of the aniline series.

The Examples which follow will illustrate the invention in more detail. The parts and percentages are by weight, unless otherwise stated.

EXAMPLE 1

9.3 parts of aniline were suspended in 50 parts of water, 70 parts by volume of 5 N hydrochloric acid in 100 parts of ice, and the suspension was cooled down to 0° C. a solution of 7.6 parts of NaNO₂ in 33 parts of water were added dropwise. After about 1 hour at 0°–5° C. and after the excess nitrite had been decomposed with sulfamic acid, the diazonium salt solution was gradually added to a suspension of 16.6 parts of 2-amino-4-chloro-3-cyanothiophene in 500 parts by volume of methanol and 500 parts of ice. After about 5 hours at 0°–5° C. the precipitated dye of the formula

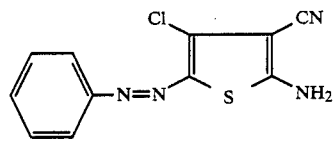

was filtered off with suction, washed with water until neutral and dried at 50° C. under reduced pressure. 20 parts of dye were obtained.

3.9 parts of this dye were dissolved in 34 parts by volume of 85% strength phosphoric acid and 34 parts by volume of glacial acetic acid. The solution was cooled down to 0° C. 4.95 parts of 40% strength nitrosylsulfuric acid were added. After 1 hour stirring at 0° C. the diazonium salt solution was slowly added dropwise to a solution of 3.2 parts of N-butyl-(N-2-cyanoethyl)aniline in 60 parts by volume of methanol together with about 100 parts of ice and 0.2 part of sulfamic acid. After 2 hours the precipitated dye of the formula

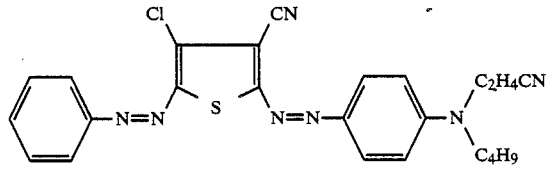

was filtered off with suction, washed until neutral and dried. The dye obtained in an amount of 6.2 parts, dyes polyester fabrics in fast navy shades.

EXAMPLE 2

13 parts of 4-chloroaniline were dissolved in 80 parts of water and 30 parts by volume of concentrated hydrochloric acid. 100 parts of ice were added, and the solution was cooled down to 0° C. 7.6 parts of NaNO₂, dissolved in 33 parts of water, were added dropwise. The mixture was stirred at 0°–5° C. for 3 hours. The excess nitrite was then destroyed with sulfamic acid. The diazonium solution was gradually added to a suspension of 16.6 parts of 2-amino-4-chloro-3-cyanothiophene in 500 parts by volume of methanol and 500 parts of ice. After about 6 hours at 0°–5° C. the precipitated dye of the formula

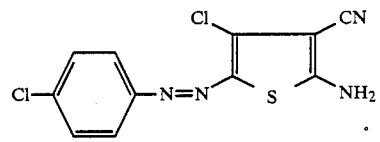

was filtered off with suction, washed until neutral and dried (23.2parts).

4.45 parts of this dye were dissolved in 34 parts by volume of 85% strength phosphoric acid and 34 parts by volume of glacial acetic acid. The solution was cooled down to 0° C. 4.95 parts of 40% strength nitrosylsulfuric acid were added. After stirring at 0° C. for an hour the diazonium salt solution was slowly added dropwise to a solution of 2.8 parts of (N-2-cyanoethyl)-N-ethylaniline in 60 parts by volume of methanol together with about 100 parts of ice and 0.2 part of sulfamic acid. After about 3 hours the precipitated dye of the formula

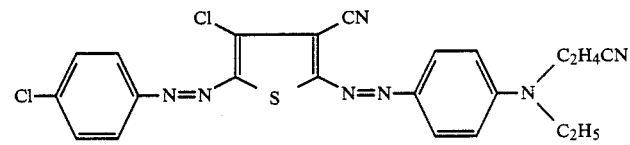

was filtered off with suction, washed until neutral and dried. The dye, obtained in an amount of 4.9 parts, dyes polyester fabrics in fast blue shades.

Table 1 below gives further dyes according to the invention which are obtained similarly to the above Examples. The dyes of Table 1 and also those of Tables 2 and 3 below each conform to the formula

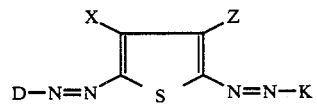

TABLE 1

| Example | D— | X | Z | —K | Hue on PES |
|---|---|---|---|---|---|
| 3 | ⌬— | Cl | CN | —⌬—N(C₂H₄OCOCH₃)₂ | navy |

TABLE 1-continued

| Example | D— | X | Z | —K | Hue on PES |
|---|---|---|---|---|---|
| 4 | 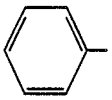 | Cl | CN | 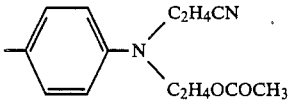 phenyl-N(C₂H₄CN)(C₂H₄OCOCH₃) | navy |
| 5 | 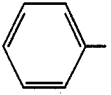 | Cl | CN | 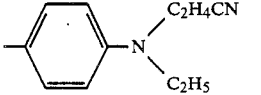 phenyl-N(C₂H₄CN)(C₂H₅) | navy |
| 6 | 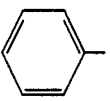 | Cl | CN | 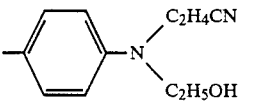 phenyl-N(C₂H₄CN)(C₂H₅OH) | navy |
| 7 | 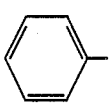 | Cl | CN | 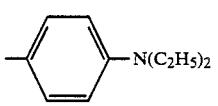 phenyl-N(C₂H₅)₂ | blue |
| 8 | 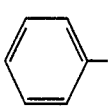 | Cl | CN | 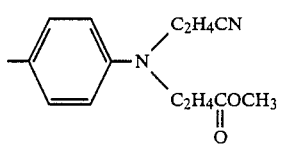 phenyl-N(C₂H₄CN)(C₂H₄COCH₃) | navy |
| 9 | 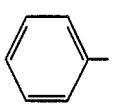 | Cl | CN | 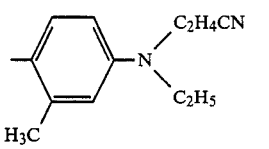 3-methylphenyl-N(C₂H₄CN)(C₂H₅) | blue |
| 10 | 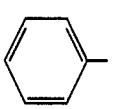 | Cl | CN | 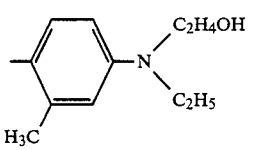 3-methylphenyl-N(C₂H₄OH)(C₂H₅) | blue |
| 11 | 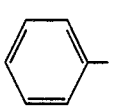 | Cl | CN | 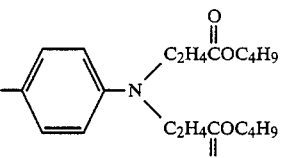 phenyl-N(C₂H₄COC₄H₉)₂ | navy |
| 12 | 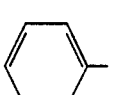 | Cl | CN | 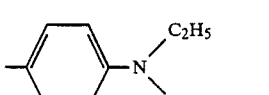 phenyl-N(C₂H₅)(C₂H₄OH) | navy |
| 13 | 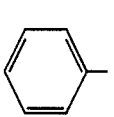 | Cl | CN | 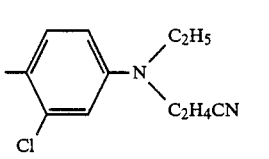 3-chlorophenyl-N(C₂H₅)(C₂H₄CN) | navy |
| 14 | 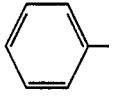 | Cl | CN | 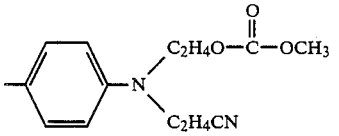 phenyl-N(C₂H₄O-CO-OCH₃)(C₂H₄CN) | navy |

TABLE 1-continued
| Example | D— | X | Z | —K | Hue on PES |
|---|---|---|---|---|---|
| 15 | 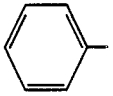 | Cl | CN |  | blue |
| 16 | 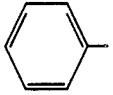 | Cl | CN | 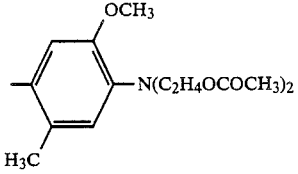 | blue |
| 17 | 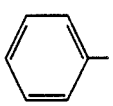 | Cl | CN | 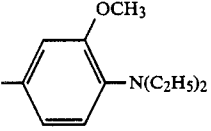 | blue |
| 18 | 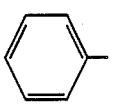 | Cl | CN | 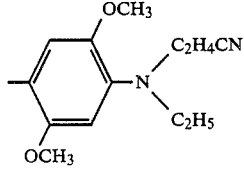 | blue |
| 19 | 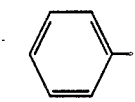 | Cl | CN | 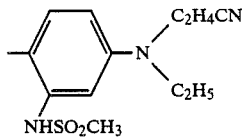 | blue |
| 20 | 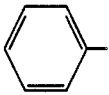 | Cl | CN | 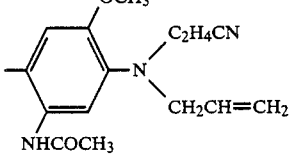 | greenish blue |
| 21 | 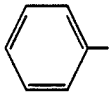 | Cl | CN | 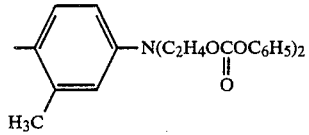 | blue |
| 22 | 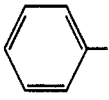 | Cl | CN | 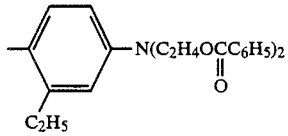 | blue |
| 23 | 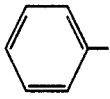 | Cl | CN | 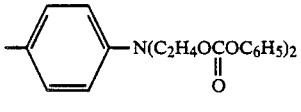 | blue |
| 24 | 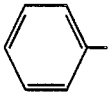 | Cl | CN | 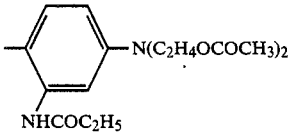 | blue |

TABLE 1-continued

| Example | D— | X | Z | —K | Hue on PES |
|---|---|---|---|---|---|
| 25 | phenyl | Cl | CN | 4-methyl-3-(NHCOCH₂Cl)phenyl-N(C₂H₄OCH₃)(C₂H₄CN) | blue |
| 26 | phenyl | Cl | CN | 4-methylphenyl-N(C₂H₄CN)(C₂H₄OCONHC₄H₉) | navy |
| 27 | phenyl | Cl | CN | 4-methylphenyl-N(C₂H₄OCH₃)(C₂H₄OCOCH₃) | blue |
| 28 | 4-Cl-phenyl | Cl | CN | 4-methylphenyl-N(C₂H₄OCOCH₃)(C₂H₄CN) | navy |
| 29 | 2,4-diCl-phenyl | Cl | CN | 4-methyl-3-methylphenyl-N(C₂H₅)(C₂H₄CN) | blue |
| 30 | 2,6-diCl-phenyl | Cl | CN | 4-methylphenyl-N(C₂H₄OCOCH₃)₂ | blue |
| 31 | 4-(CH₃SO₂)phenyl | Cl | CN | 4-methylphenyl-N(C₂H₅)(C₂H₄OH) | blue |
| 32 | 3-Cl-4-(C₂H₅SO₂)phenyl | Cl | CN | 4-methyl-3-methylphenyl-N(C₂H₅OH)₂ | blue |
| 33 | 4-(C₆H₅SO₂)phenyl | Cl | CN | 4-methylphenyl-N(C₂H₄CN)(C₄H₉(n)) | blue |
| 34 | 4-((C₂H₅)₂N—SO₂)phenyl | Cl | CN | 2-OCH₃-4-methyl-5-(NHCOCH₃)phenyl-N(C₂H₄OCOCH₃)₂ | bluish green |
| 35 | 4-O₂N-phenyl | Cl | CN | 4-methylphenyl-N(C₂H₄CN)(C₂H₅) | green |

TABLE 1-continued

| Example | D— | X | Z | —K | Hue on PES |
|---|---|---|---|---|---|
| 36 | 3-O₂N-C₆H₄— | Cl | CN | —C₆H₄—N(C₂H₄OCOCH₃)(C₂H₄CN) | bluish green |
| 37 | 4-H₃C-C₆H₄— | Cl | CN | —C₆H₄—N(C₂H₄OCOC₂H₅)₂ | blue |
| 38 | 3,5-(H₃C)₂-C₆H₃— | Cl | CN | —C₆H₃(3-CH₃)—N(C₂H₅)(C₂H₄CN) | blue |
| 39 | 4-CH₃O-C₆H₄— | Cl | CN | —C₆H₄—N(C₂H₄CN)(C₂H₄OCOCH₃) | blue |
| 40 | 4-CH₃O-C₆H₄— | Cl | CN | —C₆H₄—N(C₂H₄OCOC₆H₅)₂ | blue |
| 41 | 4-CH₃O-C₆H₄— | Cl | CN | —C₆H₃(3-CH₃)—N(C₂H₄CN)(C₂H₅) | blue |
| 42 | 4-CH₃O-C₆H₄— | Cl | CN | —C₆H₄—N(C₂H₄OCOC₂H₅)₂ | blue |
| 43 | 3-CH₃O-C₆H₄— | Cl | CN | —C₆H₄—N(C₂H₄CN)(C₂H₅) | blue |
| 44 | 2-Cl-4-H₃C-C₆H₃— | Cl | CN | —C₆H₄—N(C₂H₅)(C₂H₄OH) | blue |
| 45 | 2-OCH₃-4-O₂N-C₆H₃— | Cl | CN | —C₆H₄—N(C₂H₄CN)(C₂H₄CO₂CH₃) | bluish green |
| 46 | 4-Br-C₆H₄— | Cl | CN | —C₆H₄—N(C₂H₄CN)(C₄H₉) | blue |

TABLE 1-continued

| Example | D— | X | Z | —K | Hue on PES |
|---|---|---|---|---|---|
| 47 | 3-methyl-4-cyano-5-(ethoxycarbonyl)thiophen-2-yl (H₃C, CN, H₅C₂O₂C, S) | Cl | CN | 4-[N-(C₂H₄CN)(C₂H₅)]phenyl | green |
| 48 | 3-cyano-5-formyl-thiophen-2-yl (CN, OHC, S) | Cl | CN | 4-[N(C₂H₄OCOCH₃)₂]phenyl | green |
| 49 | 3-chloro-4-cyano-5-formyl-thiophen-2-yl (Cl, CN, OHC, S) | Cl | CN | 4-[N-(C₂H₄OH)(C₂H₅)]phenyl | green |
| 50 | 3-methyl-4-cyano-isothiazol-5-yl (H₃C, CN, N, S) | Cl | CN | 4-[N-(C₂H₄OCOCH₃)(C₂H₄CN)]phenyl | bluish green |
| 51 | 3-benzyl-4-cyano-isothiazol-5-yl (C₆H₅CH₂, CN, N, S) | Cl | CN | 3-methyl-4-[N(C₂H₄OH)₂]phenyl | green |
| 52 | phenyl | Br | CN | 3-methyl-4-[N-(C₂H₄OCOCH₃)(C₂H₄CN)]phenyl | blue |
| 53 | phenyl | Cl | CN | 5-amino-4-methyl-1-cyclohexyl-pyrazol-3-yl | red |
| 54 | phenyl | Cl | CN | 4-methyl-5-phenyl-2-(N(C₂H₅))thiazol- | green |
| 55 | phenyl | Cl | CN | 3-cyano-5-methyl-2-(N(C₂H₅)₂)thiophen-4-yl | bluish green |
| 56 | phenyl | Cl | CN | 1-(C₂H₄OH)-2,4,4,6,7-pentamethyl-1,2,3,4-tetrahydroquinolin-yl | green |

TABLE 1-continued

| Example | D— | X | Z | —K | Hue on PES |
|---|---|---|---|---|---|
| 57 |  | Cl | CN | 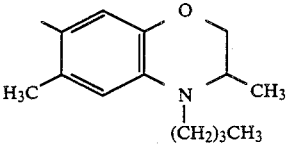 | green |
| 58 |  | Cl | CN | 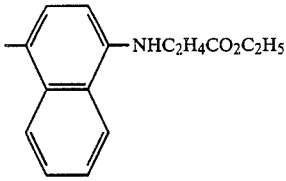 | green |
| 59 |  | Cl | CN | 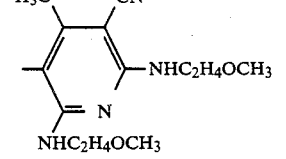 | reddish blue |
| 60 |  | Cl | CO$_2$C$_2$H$_5$ | 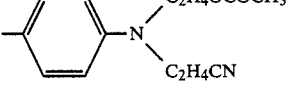 | navy |
| 61 |  | Cl | CO$_2$C$_4$H$_9$ | 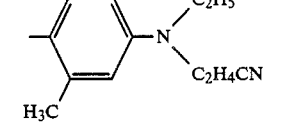 | navy |
| 62 | 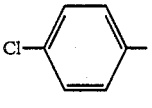 | Cl | CO$_2$C$_2$H$_5$ | 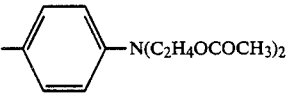 | blue |
| 63 | 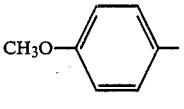 | Cl | CO$_2$CH$_3$ | 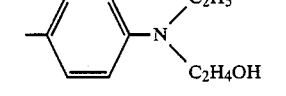 | navy |
| 64 |  | Cl | CN | 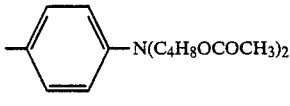 | blue |
| 65 |  | Cl | CN | 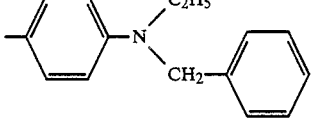 | blue |
| 66 | 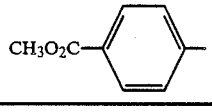 | Cl | CN | 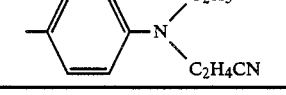 | blue |

EXAMPLE 67

7.05 parts of 4-nitroaniline were suspended in 50 parts by volume of 3:1 glacial acetic acid/propionic acid. At 15°–20° C., 60 parts by volume of concentrated sulfuric acid were added, and the mixture was cooled down to 0° C. 16.5 parts of 40% strength nitrosylsulfuric acid were then slowly added dropwise, and the solution was stirred at 0°–5° C. for 4 hours.

To this diazonium salt solution were added dropwise at about 10° C. 9.8 parts of 2-amino-3-cyano-4-ethoxy-thiophene, suspended in 150 parts by volume of glacial acetic acid. 1 part of sulfamic acid was then added, and the reaction solution was diluted with ice-water to 2000 parts by volume. At 0°–5° the solution was then brought to pH 3.5 with about 38 parts of sodium hydroxide in 100 parts of water. After 4 hours the precipitated dye of the formula

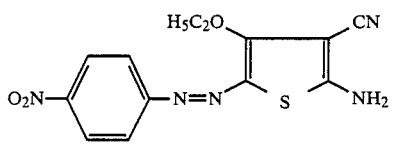

was filtered off with suction, washed and dried (14.9 parts).

4.75 parts of this dye were dissolved in 34 parts by volume of 85% strength phosphoric acid and 34 parts by volume of glacial acetic acid. The solution was cooled down to 0° C. 4.95 parts of 40% strength nitrosylsulfuric acid were gradually added. After 1 hour stirring at 0° C. this diazonium salt solution was slowly added dropwise to a solution of 3.2 parts of N-butyl-(N-2-cyanoethyl)aniline in 60 parts by volume of methanol together with about 100 parts of ice and 0.2 part of sulfamic acid. The precipitated dye of the formula

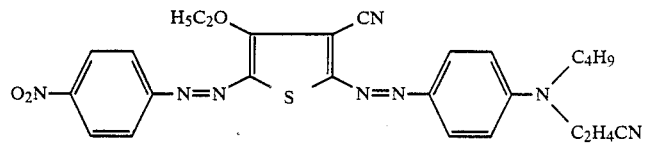

was filtered off with suction, washed and dried. The dye, obtained in a yield of 6.1 parts, dyes polyester fabrics in fast bluish green shades.

Table 2 below gives further dyes according to the invention which are obtained similarly to the above Example.

TABLE 2

| Example | D— | X | Z | —K | Hue on PES |
|---|---|---|---|---|---|
| 68 |  | $OC_2H_5$ | CN | 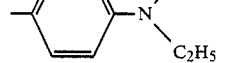 | navy |
| 69 |  | $OC_2H_5$ | CN | 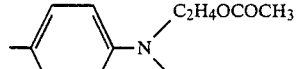 | navy |
| 70 |  | $OC_2H_5$ | CN | 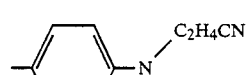 | blue |
| 71 |  | $OC_2H_5$ | CN |  | navy |
| 72 |  | $OC_2H_5$ | CN | 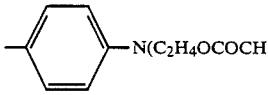 | navy |
| 73 |  | $OC_2H_5$ | CN | 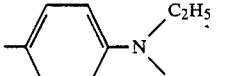 | blue |
| 74 |  | $OC_2H_5$ | CN |  | blue |

TABLE 2-continued

| Example | D— | X | Z | —K | Hue on PES |
|---|---|---|---|---|---|
| 75 | 4-Cl-C6H4— | OC2H5 | CN | 4-[N(C2H5)(C2H4CN)]-3-CH3-C6H3— | blue |
| 76 | 4-CH3-C6H4— | OC2H5 | CN | 4-[N(C2H4OCOC2H5)(C2H4CN)]-C6H4— | blue |
| 77 | 3-CH3O-C6H4— | OC2H5 | CN | 4-[N(C2H4CN)(C4H9(n))]-C6H4— | blue |
| 78 | 3-Cl-4-CN-5-OHC-thiophen-2-yl | OC2H5 | CN | 4-[N(C2H4OH)(C2H5)]-C6H4— | green |
| 79 | C6H5— | C6H5S | CN | 4-[N(C2H4CN)(C2H5)]-C6H4— | blue |
| 80 | C6H5— | C6H5S | CN | 4-[N(C2H4OCOCH3)2]-3-CH3-C6H3— | blue |
| 81 | C6H5— | C6H5S | CN | 4-[N(C2H4OCOC6H5)(C2H4CN)]-C6H4— | blue |
| 82 | C6H5— | C6H5—SO2 | CN | 4-[N(C2H4CN)(C2H5)]-3-CH3-C6H3— | blue |

EXAMPLE 83

0.62 parts of sodium phenylsulfinate was added to 1.2 parts of the disazo dyes described in Example 1, in 25 parts by volume of N,N-dimethylformamide. After stirring at 25° C. for 12 hours the reaction mixture was discharged onto 300 parts of water, and the dye of the formula

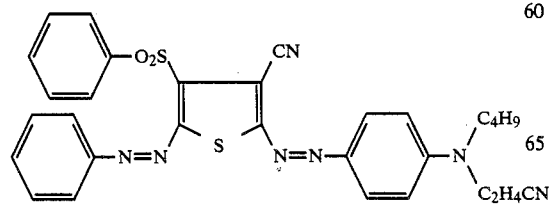

was salted out with NaCl, filtered off with suction, washed and dried. The dye, obtained in a yield of 1.4 parts, dyes polyester fibers in fast blue shades.

EXAMPLE 84

0.41 part of thiophenol and 0.7 part by volume of 30% strength methanolic sodium methylate solution were added to 1.2 parts of the disazo dye described in Example 1, in 25 parts by volume of N,N-dimethylformamide. After stirring at 25° C. for 24 hours the reaction mixture was discharged onto 300 parts of water. The dye of the formula

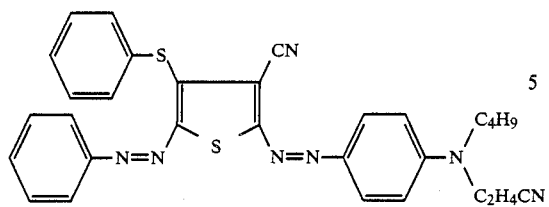

was salted out with NaCl, filtered off with suction, washed and dried. The dye, obtained in a yield of 1.3 parts, dyes polyester fibers in fast blue shades.

Table 3 below gives further dyes according to the invention which are obtained similarly to the above Examples.

TABLE 3

| Example | D— | X | Z | —K | Hue on PES |
|---|---|---|---|---|---|
| 85 | C6H5— | C6H5—SO2 | CN | 4-N(C2H5)(C2H4OH)-C6H4— | blue |
| 86 | C6H5— | C6H5—SO2 | CN | 4-N(C2H4OCOCH3)(C2H4CN)-C6H4— | blue |
| 87 | C6H5— | C6H5—SO2 | CN | 3-CH3-4-N(C2H4OCOCH3)2-C6H3— | blue |
| 88 | C6H5— | C6H5—SO2 | CN | 3-Cl-4-N(C2H4OH)2-C6H3— | blue |
| 89 | 4-Cl-C6H4— | C6H5—SO2 | CN | 4-N(CH3)(C2H4OH)-C6H4— | blue |
| 90 | 4-H3CO-C6H4— | C6H5—SO2 | CN | 4-N(CH2CH=CH2)(C2H4CN)-C6H4— | blue |
| 91 | C6H5— | C6H5S | CN | 4-N(C2H4OCOC2H5)(C2H4CN)-C6H4— | blue |
| 92 | C6H5— | C6H5S | CN | 3-CH3-4-N(C2H4OH)2-C6H3— | blue |
| 93 | C6H5— | C6H5S | CN | 4-N(C2H4CN)(C2H4OH)-C6H4— | blue |

TABLE 3-continued

| Example | D— | X | Z | —K | Hue on PES |
|---|---|---|---|---|---|
| 94 | phenyl | C$_6$H$_5$S | CN | 4-N(C$_2$H$_4$CN)(C$_2$H$_4$OCOC$_2$H$_5$)-phenyl | blue |
| 95 | phenyl | CH$_3$S | CN | 4-N(C$_2$H$_4$CN)(C$_4$H$_9$)-phenyl | blue |
| 96 | phenyl | C$_2$H$_5$S | CN | 4-N(C$_2$H$_4$CN)(C$_4$H$_9$)-phenyl | blue |
| 97 | 4-CH$_3$-phenyl | C$_6$H$_5$S | CN | 4-N(C$_2$H$_4$CN)(C$_2$H$_4$OCOCH$_3$)-phenyl | blue |
| 98 | phenyl | C$_6$H$_5$O | CN | 4-N(C$_2$H$_4$CN)(C$_4$H$_9$)-phenyl | blue |
| 99 | 4-CH$_3$O-phenyl | C$_6$H$_5$S | CN | 4-N(C$_2$H$_4$CN)(C$_2$H$_5$)-3-CH$_3$-phenyl | blue |

We claim:

1. A disazothiophene dye of the formula

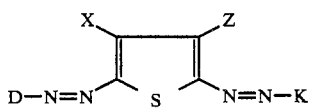

wherein:

X which is an electron withdrawing group is fluorine, chlorine, bromine, hydroxyl, mercapto, $C_1$–$C_4$-alkoxy, $C_1$–$C_4$-alkoxy substituted by phenyl, $C_5$–$C_7$-cycloalkoxy, phenoxy, phenoxy substituted by methyl or chlorine, $C_1$–$C_4$-alkylthio, $C_1$–$C_4$-alkythio substituted by phenyl, $C_5$–$C_7$-cyloalkylthio, phenylthio, phenylthio substituted by methyl, or SO$_2$—E, where E is $C_1$–$C_4$-alkyl, phenylsubstituted $C_1$–$C_8$-alkyl, $C_3$–$C_4$-alkenyl, $C_5$–$C_7$-cycloalkyl, phenyl, phenyl substituted by chlorine or butyl, chlorine, hydroxyl, $C_1$–$C_4$-alkoxy, or $C_1$–$C_4$-alkoxy substituted by phenyl, or E is phenoxy, phenoxy substituted by chlorine or methyl, amino, $C_1$–$C_4$-monoalkylamino or $C_1$–$C_4$-dialkylamino or phenylamino, phenylamino substituted by chlorine or methyl, Z is cyano, nitro, $C_1$–$C_8$-alkanoyl, benzoyl, benzoyl substituted by one or two methyl, one or two chlorine, or methoxy, $C_1$–$C_4$-alkylsulfonyl, phenylsulfonyl, phenylsulfonyl substituted by chlorine or methyl, carboxyl, $C_1$–$C_8$-alkoxycarbonyl, or $C_1$–$C_8$-alkoxycarbonyl whose alkyl chain is interrupted by one oxygen atom, or is phenoxycarbonyl, phenoxycarbonyl substituted by methyl, carbamoyl, $C_1$–$C_8$-monoalkylcarbamoyl or $C_1$–$C_8$-dialkylcarbamoyl, pyrrolidinocarbonyl, piperidinocarbonyl, morpholinocarbonyl, piperazinocarbonyl or (N-$C_1$–$C_4$-alkyl)-piperazinocarbonyl, D is the radical of a diazo component, and
K is the radical of a coupling component.

2. The disazothiophene of claim 1, where D is derived from a diazo component of the formula

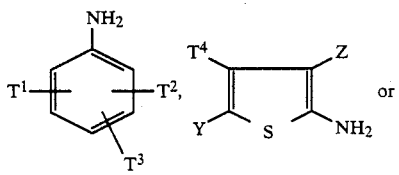

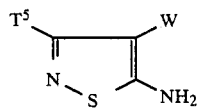

where

T$^1$ and T$^2$ are each independently hydrogen, chlorine, bromine, cyano, CF$_3$, nitro, $C_1$–$C_4$-alkyl, $C_1$–$C_4$-alkoxy, phenoxy, phenyl, $C_1$–$C_4$-alkylcarbonyl, $C_1$–$C_4$-alkoxycarbonyl, $C_1$–$C_4$-alkylsulfonyl, phenylsulfonyl, benzylsulfonyl, carboxyl, carbamoyl, $C_1$-$C_4$-monoalkylcarbamoyl, $C_1$-$C_4$-dialkylcarbamoyl, $C_1$-$C_4$-monoalkylcarbamoyl substituted by hydroxyl, or $C_1$-$C_4$-dialkylcarbamoyl substituted by hydroxyl, or $T^1$ and $T^2$ are each independently sulfamoyl, $C_1$-$C_4$-monoalkylsulfamoyl, $C_1$-$C_4$-dialkylsulfamoyl, $C_1$-$C_4$-monoalkylsulfamoyl substituted by hydroxyl, or $C_1$-$C_4$-dialkylsulfamoyl substituted by hydroxyl, $T^3$ is hydrogen, chlorine, bromine, $C_1$-$C_4$-alkyl or cyano, $T^4$ is hydrogen, $C_1$-$C_4$-alkyl, phenyl, phenyl substituted by chlorine, thienyl, furyl, halogen, $C_1$-$C_4$-alkylsulfonyl, phenylsulfonyl, $C_1$-$C_4$-alkoxy, phenoxy, $C_1$-$C_4$-alkylthio $C_1$-$C_4$-alkylthio substituted by hydroxyl, $C_1$-$C_4$-alkylcarbonyl, cyano or nitro, or phenylthio, $T^5$ is $C_1$-$C_4$-alkyl, $C_1$-$C_4$-alkyl substituted by chlorine, bromine, hydroxyl, $C_1$-$C_4$-alkoxy or phenyl, phenyl, or phenyl substituted by chlorine, bromine, hydroxyl, or $C_1$-$C_4$-alkoxy, Y is hydrogen, $C_1$-$C_4$-alkyl, phenyl, phenyl substituted by methyl, methoxy or chlorine, chlorine, bromine, nitro, cyano, $C_1$-$C_4$-alkanoyl, benzoyl, $C_1$-$C_4$-alkoxycarbonyl, $C_1$-$C_4$-alkylsulfonyl or phenylsulfonyl, and W is cyano, nitro, $C_1$-$C_4$-alkoxycarbonyl, phenoxycarbonyl, chlorine or bromine.

3. The disazothiophene dye of claim 1, where K is derived from a coupling component of the formulae

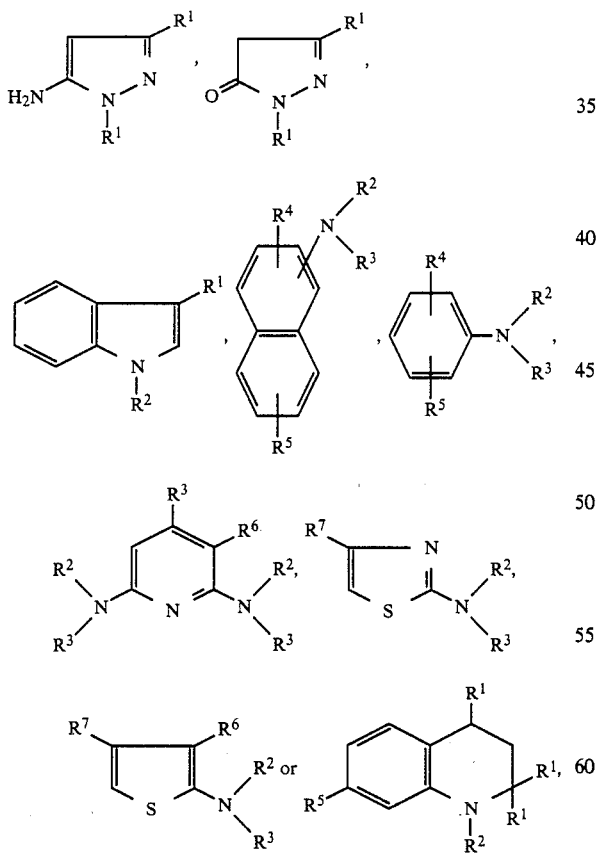

wherein:
$R^1$ is hydrogen, $C_1$-$C_4$-alkyl, or $C_1$-$C_4$-alkyl substituted by phenyl, phenyl, phenyl substituted by methyl or chlorine, $R^2$ is hydrogen or $R^3$, $R^3$ is $C_1$-$C_6$-alkyl, $C_1$-$C_6$-alkyl substituted by chlorine, bromine, hydroxyl, $C_1$-$C_8$-alkoxy, phenoxy, phenyl, cyano, carboxyl, $C_1$-$C_8$alkanoyloxy, $C_1$-$C_8$-alkoxy-$C_1$-$C_4$-alkoxy, benzyloxy, o-, m- or p-methylbenzoyloxy, o-, m- or p-chlorobenzoyloxy, $C_1$-$C_4$-alkoxy-$C_1$-$C_8$-alkanoyloxy, phenoxyalkanoyloxy, $C_1$-$C_8$-alkoxycarbonyloxy, $C_1$-$C_4$-alkoxy-$C_1$-$C_4$-alkoxycarbonyloxy, benzyloxycarbonyloxy, phenethyloxycarbonyloxy, phenoxyethoxycarbonyloxy, $C_1$-$C_8$-alkylaminocarbonyloxy, cyclohexylaminocarbonyloxy, phenylaminocarbonyloxy, $C_1$-$C_8$-alkoxycarbonyl, $C_1$-$C_4$-alkoxy-$C_1$-$C_4$-alkoxycarbonyl, phenoxycarbonyl, benzyloxycarbonyl, phenoxy-$C_1$-$C_4$-alkoxy or phenethyloxycarbonyl, or $R^3$ is $C_5$-$C_7$-cycloalkyl, $C_3$-$C_4$-alkenyl, phenyl, or methoxyphenyl, $R^4$ and $R^5$ are each independently of the other hydrogen, $C_1$-$C_4$-alkyl, $C_1$-$C_4$-alkoxy, phenoxy, benzyloxy, halogen, $C_1$-$C_4$-alkylsulfonylamino, $C_1$-$C_4$-dialkylaminosulfonylamino, $C_1$-$C_4$-alkoxycarbonylamino substituted by chlorine, bromine, cyano, methoxy, ethoxy or phenoxy $C_1$-$C_4$-alkoxycarbonylamino, benzoylamino, benzoylamino substituted by chlorine, bromine, cyano, methoxy, ethoxy or phenoxy, or $C_1$-$C_6$-alkanoylamino, $C_1$-$C_6$-alkanoylamino substituted by chlorine, bromine, cyano, methoxy, ethoxy or phenoxy, $R^6$ is cyano, carbamoyl, $C_1$-$C_4$-monoalkylcarbamoyl or $C_1$-$C_4$-dialkylcarbamoyl, nitro, $C_1$-$C_8$-alkoxycarbonyl, or $C_1$-$C_8$-alkoxycarbonyl whose alkyl chain is interrupted by one oxygen atom, and $R^7$ is halogen, phenyl, phenyl substituted by chlorine, or $C_1$-$C_{10}$-alkyl, $C_1$-$C_{10}$-alkoxy, $C_1$-$C_{10}$-alkyl substituted by phenyl or whose alkyl chains are interrupted by one oxygen atom, or $C_1$-$C_{10}$-alkoxy substituted by phenyl or whose alkyl chains are interrupted by one oxygen atom, or is phenoxy, nitro, $C_1$-$C_4$-alkoxycarbonyl, $C_1$-$C_4$-monoalkylamino or $C_1$-$C_4$-dialkylamino, $C_1$-$C_4$-alkylthio, phenylthio, $C_1$-$C_5$-alkanoylamino, $C_1$-$C_4$-alkoxycarbonylmethyl or cyanomethyl.

4. The disazothiophene dye of claim 1, wherein:
X which is an electron withdrawing group is chlorine, bromine, hydroxyl, mercapto, $C_1$-$C_4$-alkoxy, or $C_1$-$C_4$-alkoxy substituted by phenyl, or is $C_5$-$C_7$-cycloalkoxy, phenoxy, phenoxy substituted by chlorine or methyl, $C_1$-$C_4$-alkylthio, or $C_1$-$C_4$-alkylthio substituted by phenyl, or is $C_5$-$C_7$-cycloalkylthio, phenylthio, phenylthio substituted by methyl, or $SO_2$—E, where E is methyl, ethyl or phenyl, Z is cyano, $C_1$-$C_8$-alkoxycarbonyl, or $C_1$-$C_8$alkoxycarbonyl whose alkyl chain is interrupted by one oxygen atom, D is the radical of a diazo component of the benzene, thiophene or isothiazole series, and K is the radical of a coupling component of the aniline or pyridine series.

5. The disazothiophene dye of claim 1, wherein said substituted phenyl is phenyl substituted by $C_1$-$C_4$-alkyl, $C_1$-$C_4$-alkoxy or halogen.

6. The disazothiophene dye of claim 1, wherein X which is an electron withdrawing group is $OCH_3$, $OC_2H_5$, $OCH_3H_7$, $OC_4H_9$, $OCH_2C_6H_5$, $OC_6H_{11}$, $OC_6H_5$, $OC_6H_4CH_3$, $OC_6H_4Cl$, $SCH_3$, $SC_2H_5$, $SC_3H_7$, $SC_4H_9$, $SCH_2C_6H_5$, $SC_2H_4OH$, $SCH_2CO_2CH_3$, $SCH_2CO_2C_2H_5$, $SC_6H_{11}$, $SC_6H_5$ or $SC_6H_4CH_3$.

7. Th disazothiophene dye of claim 1, wherein E is $CH_3$, $C_2H_5$, $C_3H_7$, $C_4H_9$, $C_6H_{13}$, $C_6H_{11}$, $C_8H_{17}$, $C_6H_5$, $C_6H_5$—$CH_2$—$CH_2$, $C_6H_5$, Cl—$C_6H_4$, $C_4H_9$—$C_6H_4$, Cl, OH, $CH_3O$, $C_2H_5O$, $C_3H_7O$, $C_4H_9O$, $C_6H_5$—$CH_2O$, $C_6H_5$—$CH_2$—$CH_2O$, $C_6H_5O$, $ClC_6H_4O$, $CH_3C_6H_4O$, $NH_2$, $NHCH_3$, $N(CH_3)_2$, $NHC_2H_5$, $N(C_2H_5)_2$, $NHC_4H_9$, $N(C_4H_9)_2$, $NHC_6H_5$, $NHC_6H_4$—$CH_3$, $NHC_6H_4Cl$ or $NCH_3C_6H_4$.

8. The disazothiophene dye of claim 1, wherein Z is $CH_3CO$, $C_2H_5CO$, $C_3H_7CO$, $C_4H_9CO$, $C_5H_{11}CO$, $C_7H_{15}CO$, $COCH(C_2H_5)(C_4H_9)$, $C_6H_5CO$, $CH_3C_6H_4CO$, $ClC_6H_4CO$, $(CH_3)_2C_6H_3CO$, $H_3COC_6H_4CO$, $Cl_2C_6H_3CO$, $CH_3SO_2$, $C_2H_5SO_2$, $C_4H_9SO_2$, $C_6H_5SO_2$, $CH_3C_6H_4SO_2$, $ClC_6H_4SO_2$, $COOCH_3$, $COOC_2H_5$, $COOC_3H_7$, $COOC_4H_9$, $COOC_6H_{13}$, $COOC_8H_{17}$, $COOCH_2CH(C_2H_5)(C_4H_9)$, $COOC_2H_4OCH_3$, $COOC_2H_4OC_2H_5$, $COOC_2H_4OC_4H_9$, $COOC_6H_5$, $COOC_6H_4CH_3$, $CONH_2$, $CONHCH_3$, $CONHC_2H_5$, $CONHC_4H_9$, $CONHC_6H_{13}$, $CONHC_8H_{17}$, $CON(CH_3)_2$, $CON(C_2H_5)_2$, $CON(CH_3)(C_2H_5)$.

9. The disazothiophene dye of claim 2, wherein $T^1$ or $T^2$ is methyl, ethyl, methoxy, ethoxy, methylcarbony, ethoxycarbonyl, ethylsulfonyl, phenylsulfonyl, dimethylcarbamoyl, 2-hydroxyethylcarbamoyl or 2-hydroxypropylsulfamoyl.

10. The disazothiophene dye of claim 2, wherein $T^3$ is methyl, ethyl, propyl, or butyl.

11. The disazothiophene dye of claim 2, wherein $T^4$ is $C_1$–$C_4$-alkylthio substituted by hydroxyl, $C_1$–$C_4$-alkoxycarbonyl, $C_1$–$C_4$-alkylcarbonyl, cyano, nitro, methyl, ethyl, 4-chlorophenyl, thien-2-yl, fur-2-yl, chlorine, bromine, methylsulfonyl, ethylsulfonyl, methoxy, ethoxy, methylthio, ethylthio, or 2-hydroxyethylthio.

12. The disazothiophene dye of claim 2, wherein $T^5$ is $C_1$–$C_4$-alkyl substituted by chlorine, bromine, hydroxyl, or $C_1$–$C_4$-alkoxy.

13. The disazothiophene dye of claim 2, wherein $T^5$ is phenyl substituted by chlorine, bromine, hydroxyl, or $C_1$–$C_4$-alkoxy.

14. The disazothiophene dye of claim 2, wherein $T^5$ is $C_1$–$C_4$-alkyl substituted by phenyl.

15. The disazothiophene dye of claim 2, wherein $T^5$ is methyl, ethyl, isopropyl, benzyl, 2-phenylethyl, 2-hydroxyethyl, 2-methoxyethyl, 2-chlorophenyl or 2-hydroxyphenyl.

16. The disazothiophene dye of claim 2, wherein Y is HCO, $CH_3CO$, $C_6H_5CO$, $CH_3SO_2$, $C_2H_5SO_2$, $C_6H_5SO_2$, $CH_3$, $C_2H_5$, $C_3H_7$, $C_4H_9$, $C_6H_5$, $C_6H_4CH_3$, $C_6H_4Cl$ and $C_6H_4OCH_3$.

17. The disazothiophene dye of claim 2, wherein W is methoxycarbonyl, ethoxycarbonyl, butoxycarbonyl or phenoxycarbonyl.

18. The disazothiophene dye of claim 3, wherein $R^1$ is methyl, ethyl, propyl, butyl, benzyl, phenethyl, phenyl, o-, m- or p-tolyl or o-, m- or p-chlorophenyl.

19. The disazothiophene dye of claim 3, wherein $R^3$ is $C_1$–$C_6$-alkyl substituted by chlorine, bromine, hydroxyl, $C_1$–$C_8$-alkoxy, phenoxy, phenyl, cyano, carboxyl, $C_1$–$C_8$-alkanoyloxy, $C_1$–$C_8$-alkoxy-$C_1$–$C_4$-alkoxy, benzyloxy, o-, m - or p-methylbenzoyloxy, o-, m- or p-chlorobenzoyloxy, $C_1$–$C_4$-alkoxy, $C_1$–$C_8$-alkanoyloxy, phenoxyalkanoyloxy, $C_1$–$C_8$-alkoxycarbonyloxy, $C_1$–$C_4$-alkoxy-$C_1$–$C_4$-alkoxycarbonyloxy, benzyloxycarbonyloxy, phenethyloxycarbonyloxy, phenoxyethoxycarbonyloxy, $C_1$–$C_8$-alkylaminocarbonyloxy, cyclohexylaminocarbonyloxy, phenylaminocarbonyloxy, $C_1$–$C_8$-alkoxycarbonyl, $C_1$–$C_4$-alkoxy-$C_1$–$C_4$-alkoxycarbonyl phenoxycarbonyl, benzyloxycarbonyl, phenoxy-$C_1$–$C_4$-alkoxy or phenethyloxycarbonyl.

20. The disazothiophene dye of claim 3, wherein $R^3$ is methyl, ethyl, propyl, butyl, pentyl, hexyl, allyl, methallyl, 2-chloroethyl, 2-bromoethyl, 2-cyanoethyl, 2-hydroxyethyl, 2-phenyl-2-hydroxyethyl, 2,3-dihydroxypropyl, 2-hydroxypropyl, 2-hydroxybutyl, 2-hydroxy-3-phenoxypropyl, 2-hydroxy-3-methoxypropyl, 2-hydroxy-3-butoxypropyl, 3-hydroxypropyl, 2-methoxyethyl, 2-ethoxyethyl, 2-propoxyethyl, 2-butoxyethyl, 2-phenoxyethyl, 2-phenoxypropyl, 2-acetoxyethyl, 2-propionyloxyethyl, 2-butyryloxyethyl, 2-isobutyryloxyethyl, 2-methoxymethylcarbonyloxyethyl, 2-ethoxymethylcarbonyloxyethyl, 2-phenoxymethylcarbonyloxyethyl, 2-methoxycarbonyloxyethyl, 2-ethoxycarbonyloxyethyl, 2-propoxycarbonyloxyethyl, 2-butoxycarbonyloxyethyl, 2phenyloxycarbonyloxyethyl, 2-benzyloxycarbonyloxyethyl, 2-methoxyethoxycarbonyloxyethyl, 2-ethoxyethoxycarbonyloxyethyl, 2-propoxyethoxycarbonyloxyethyl, 2-butoxyethoxycarbonyloxyethyl, 2methlaminocarbonyloxyethyl, 2-ethylaminocarbonyloxyethyl, 2-propylaminocarbonyloxyethyl, 2-butylaminocarbonyloxyethyl, 2-methoxycarbonylethyl, 2-ethoxycarbonylethyl, 2-propoxycarbonylethyl, 2-butoxycarbonylethyl, 2-phenoxycarbonylethyl, 2-benzyloxycarbonylethyl, 2-$\beta$-phenylethoxycarbonylethyl, 2-methoxyethoxycarbonylethyl, 2-ethoxyethoxycarbonylethyl, 2-propoxyethoxycarbonylethyl, 2-butoxyethoxycarbonylethyl, 2-phenoxyethoxycarbonylethyl, 2-benzoylethyl, cyclopentyl, cyclohexyl, phenyl or 4-methoxyphenyl.

21. The disazothiophene dye of claim 3, wherein $R^4$ or $R^5$ is $C_1$–$C_4$-alkoxy-carbonylamino, benzoylamino or $C_1$–$C_6$-alkanoylamino each substituted by chlorine, bromine, cyano, methoxy, ethoxy or phenoxy.

22. The disazothiophene dye of claim 3, wherein $R^4$ or $R^5$ is methyl, ethyl, methoxy, ethoxy, chlorine, bromine, methyl sulfonylamino, dimethylaminosulfonylamino, methoxycarbonylamino, acetylamino or chloroacetylamino.

23. The disazothiophene dye of claim 3, wherein $R^6$ is carbamoyl, methylaminocarbonyl, dimethylaminocarbonyl, ethylaminocarbonyl, diethylaminocarbonyl, methoxycarbonyl, ethoxycarbonyl, n-or i-propoxycarbonyl, n-, i- or sec-butoxycarbonyl, methoxyethoxycarbonyl, ethoxyethoxycarbonyl, n-or i-propoxyethoxycarbonyl, or n-, i- or sec-butoxyethoxycarbonyl.

24. The disazothiophene dye of claim 3, wherein $R^7$ is chlorine, bromine, 4-chlorophenyl, methyl, ethyl, benzyl, phenylethyl, methoxy, ethoxy, 2-methoxyethoxy, 2-butoxyethoxy, benzyloxy, methoxycarbonyl, methylamino, ethylamino, dimethylamino, methylethylamino, methylthio, acetylamino, propionylamino and methoxycarbonylmethyl.

* * * * *

UNITED STATES PATENT AND TRADEMARK OFFICE
CERTIFICATE OF CORRECTION

PATENT NO. : 4,837,269

DATED : June 06, 1989

INVENTOR(S) : Karl-Heinz ETZBACH, et al

It is certified that error appears in the above-identified patent and that said Letters Patent is hereby corrected as shown below:

On the Title Page, Item [54], the title is incorrect, it should read as follows:

--DISAZO DYES CONTAINING A 2-AMINOTHIOPHENE RADICAL SUBSTITUTED BY AN ELECTRON WITHDRAWING GROUP--

Signed and Sealed this

Tenth Day of April, 1990

Attest:

HARRY F. MANBECK, JR.

Attesting Officer

Commissioner of Patents and Trademarks